(12) United States Patent
Bedrosian (10) Patent No.: US 7,787,374 B2
(45) Date of Patent: Aug. 31, 2010

(54) DERIVATIVE PACKET DELAY VARIATION AS A METRIC FOR PACKET TIMING RECOVERY STRESS TESTING

(75) Inventor: Paul Stephan Bedrosian, Andover, MA (US)

(73) Assignee: Agere Systems Inc., Allentown, PA (US)

( * ) Notice: Subject to any disclaimer, the term of this patent is extended or adjusted under 35 U.S.C. 154(b) by 244 days.

(21) Appl. No.: 12/074,043

(22) Filed: Feb. 29, 2008

(65) Prior Publication Data

US 2008/0219180 A1 Sep. 11, 2008

Related U.S. Application Data

(60) Provisional application No. 60/904,835, filed on Mar. 2, 2007.

(51) Int. Cl.
*H04L 12/28* (2006.01)
(52) U.S. Cl. ..................... 370/230.1; 232/412
(58) Field of Classification Search ................. 370/230, 370/230.1, 235, 252, 392
See application file for complete search history.

(56) References Cited

U.S. PATENT DOCUMENTS

| | | | |
|---|---|---|---|
| 6,442,166 B1 | 8/2002 | McDonald et al. | |
| 6,571,358 B1 | 5/2003 | Culotta et al. | |
| 7,191,355 B1 | 3/2007 | Ouellette et al. | |
| 7,418,147 B2 * | 8/2008 | Kamaci et al. | 382/251 |
| 7,492,732 B2 | 2/2009 | Aweya et al. | |
| 2003/0091047 A1 * | 5/2003 | Pate et al. | 370/392 |
| 2006/0165003 A1 | 7/2006 | Partridge | |
| 2006/0193400 A1 * | 8/2006 | Morris et al. | 375/316 |
| 2008/0080563 A1 * | 4/2008 | Kataria et al. | 370/503 |
| 2008/0262991 A1 | 10/2008 | Kapoor et al. | |
| 2009/0268783 A1 * | 10/2009 | Karabinis | 375/130 |

OTHER PUBLICATIONS

"Timing and Synchronization Aspects in Packet Networks", ITU-T Recommendation G.8261/Y.1361 (May 2006).
"Ethernet Network Emulators: GEM,XGEM", High Performance Precision Emulators, Anue Systems, Inc. (Nov. 2007).
S. Kaczmarek, et al., "Methods for Evaluation Packet Delay Distribution of Flows Using Expedited Forwarding PHB", Journal of Telecomm. & Information Technology (Feb. 2004).

* cited by examiner

*Primary Examiner*—Jason E Mattis
*Assistant Examiner*—Dady Chery

(57) ABSTRACT

A method and system for analyzing simulated packet delay variation (PDV) using derivative PDV is disclosed. The delay-step method for simulating PDV determines a delay for each packet in a stream of packets generated at a regular interval. Delay target values are randomly selected based on a statistical distribution, such as a Gaussian distribution. Delay-steps are determined for each packet based on the delay target values. The delay-steps can be fixed or variable sized steps which are used to adjust the delay of sequential packets. PDV is generated by delaying each of the packets with the delay determined for that packet. The derivative PDV is calculated to evaluate a delay rate of change on a packet-by-packet basis. The derivative PDV can be used as a metric to specify stresses for adaptive packet timing recovery stress testing.

28 Claims, 9 Drawing Sheets

GAUSSIAN STANDARD NORMAL PDF

This application claims the benefit of U.S. Provisional Application No. 60/904,835, filed Mar. 2, 2007, the disclosure of which is herein incorporated by reference.

DERIVATIVE PACKET DELAY VARIATION AS A METRIC FOR PACKET TIMING RECOVERY STRESS TESTING

BACKGROUND OF THE INVENTION

The present invention relates generally to simulating data packet networks, and more particularly to simulating packet delay variation (PDV) in data packet networks for adaptive packet timing recovery stress testing.

An ongoing development in telecommunications is the convergence of voice, video, and data into a common stream. This requires migrating services typically delivered using a circuit network, such as telephony, to a packet based network. However, in a packet based network, synchronization of such services is difficult because there is no longer a precise network clock traceable signal as in a circuit switched network. The network traceable clock is used to recover the service clock of these circuit switched services (e.g., DS1, E1) to ensure error free-transmission. Circuit switched networks rely on the physical layer to transport these network clock signals between network elements to form a timing chain. The accuracy of these physical layer clock signals are typically synchronized to an accuracy of ±4.6 ppm or better. However, in packet networks, the clock signals used at the physical layer do not form a timing chain but are controlled by local free-running oscillators. Further, the accuracy of physical layer transport clock is synchronized to an accuracy of ±100 ppm Therefore, the physical layer clock signals in a packet network are not sufficient to support the error-free transport of circuit switched services over a packet network, commonly called circuit emulation. As a result, other methods must be used to recovery the service clock of circuit emulation services. The method of adaptive timing recovery typically relies on the arrival characteristics of packets as a basis to create a suitable service clock for circuit emulation.

It is well known that adaptive timing methods are sensitive to packet delay variation (PDV) in packet based networks. Accordingly, there has been an effort to take PDV into account when performing timing recovery stress testing for determining performance requirements and testing equipment for use in a packet based network. The current methodology for generating PDV is to inject background traffic with various mixes of packet sizes into a connection-oriented series of packet switches. The packet traffic of interest (PTI) then establishes a path through these switches and experiences delays and delay variation on a switch-by-switch basis. The PDV can be measured as the PTI is received after being transmitted through the packet switches. However, the current methodology is not deterministic or repeatable, since different equipment used to conduct tests can lead to different results. The current methodology cannot control metrics used to model the PDV of real-world networks, such as peak-to-peak variation, packet-to-packet variation, histogram probability density, and statistical specifications, such as mean and standard deviation. The common technique for PDF analysis of PDV is to display the percentage of delay occurrences versus bands of delay values in a histogram graph. Although, this technique concisely shows the delay values, there is no information regarding packet-to-packet delay variation.

BRIEF SUMMARY OF THE INVENTION

The present invention provides a method and system for analyzing simulated packet delay variation (PDV) using derivative PDV. According to embodiments of the present invention, derivative PDV can be used as a metric in packet timing recovery stress testing to evaluate simulated PDV based on packet-to-packet delay variation. Such information is useful for specifying or measuring delay stresses used to evaluate a packet timing recovery system.

In one embodiment of the present invention a stream of packets is received. The stream of packets is generated by generating the packets at regular intervals. A delay is determined for each packet based on a series of randomly determined delay target values. The delay target values can be selected randomly based on a probability distribution function, such as a Gaussian PDF. Delay-steps are determined for each packet based on the delay target values. The delay-steps can be fixed or variable sized steps which are used to adjust the delay of sequential packets. PDV is generated by delaying each of the packets with the delay determined for that packet. The derivative PDV is calculated to evaluate a delay rate of change on a packet-by-packet basis. The derivative PDV can be used as a metric to specify stresses for adaptive packet timing recovery stress testing.

These and other advantages of the invention will be apparent to those of ordinary skill in the art by reference to the following detailed description and the accompanying drawings.

DETAILED DESCRIPTION

PDV over a significant number of packet delay measurements can be modeled as having a Gaussian probability density function (PDF). Embodiments of the present invention are directed to using derivative PDV as a metric for evaluating simulated PDV. Derivative PDV shows packet-to-packet delay variation, which can be used for specifying or measuring stresses used to evaluate a packet timing recovery system. As described herein, delays modeled as having a Gaussian PDF are used to illustrate derivative PDV. However, the present invention is not limited to delays having Gaussian distributions, and can be applied to simulated delays having any distribution.

Figure 1:
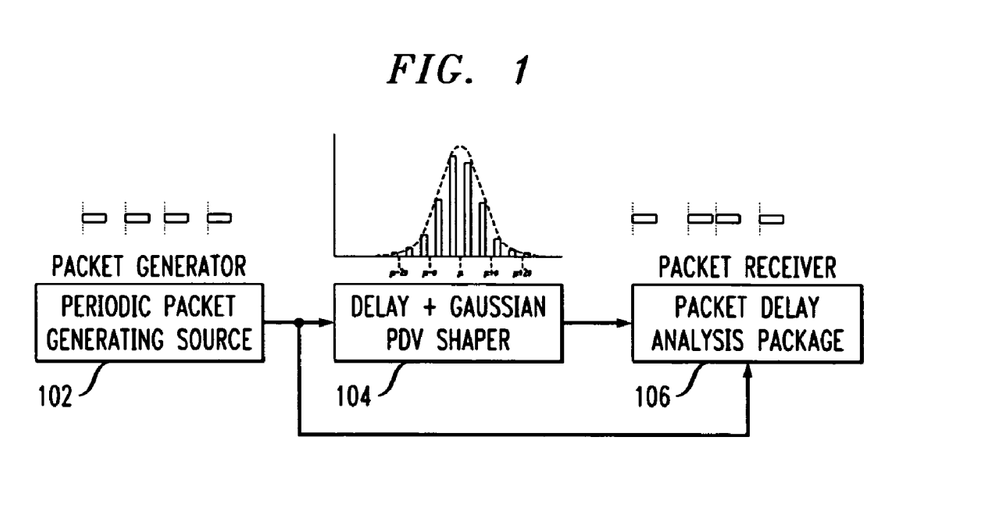
FIG. 1 illustrates a packet delay variation (PDV) simulator according to an embodiment of the present invention.

In order to illustrate the concept of derivative PDV, PDV is generated on packet traffic of interest (PTI) and then analyzed to determine packet-to-packet delay variation. FIG. 1 illustrates a PDV simulator according to an embodiment of the present invention. The PDV simulator can be implemented as an application executed by a processor on a computer system. For example, the PDV simulator can be implemented as a Microsoft Excel application, but the present invention is not limited thereto. The PDV simulator generates a user-defined delay profile for packets occurring at regular (periodic) intervals. The user defined profile for the PDV simulator of FIG. 1 has a Gaussian PDF. As illustrated in FIG. 1, the PDV simulator includes a packet generator 102, which is a periodic packet generating source, a PDV generator 104, which shapes the PDV using a Gaussian PDF, and a packet receiver 106, which includes a packet delay analysis package.

The packet generator 102 generates packets at regular (periodic) intervals. Each packet is time-stamped with the time ($T_s$) that the packet was sent. As they are generated, the packets are sent out to the PDV generator 104 and the packet receiver 106. The PDV generator 104 determines the delay and delay variation for each packet and transmits each packet with the corresponding delay to the packet receiver 106. The PDV generator 104 controls the delay and the delay variation of each packet independently. The delay variation is modeled as a Gaussian distribution PDF. The Gaussian PDF can have a selectable mean, selectable minimum and maximum PDV, and selectable minimum and maximum delay step sizes, so that the distribution can be controlled. The PDV generator 104 determines the packet delay by calculating a target delay and a delay-step size. The delay-step may be either fixed or variable with a uniform PDF.

The PDV generator 104 produces random delay values that fit a Gaussian PDF, using the following equations:

$$D_p(t) = \mu \left[ \left[ \left( \sum_{i=1}^{N} U_i(t) \right) - .5N \right] \sigma \sqrt{12/N} \right]$$

$$\sigma = \frac{1}{8}(D_{MAX} - D_{MIN})$$

$$D_{total}(t) = D_{MIN} + D_p(t)$$

where $D_p(t)$ is the packet delay due to a random Gaussian PDF, $D_{Total}(t)$ is the total delay experienced by the packet, $D_{MAX}$ is the maximum delay variation, $D_{MIN}$ is the minimum delay variation, $U_i(t)$ is a random number generator between 0 and 1 with a uniform PDF, N is a number of random samples per $D_p(t)$ calculation, $\mu$ is the desired mean of the Gaussian PDF, and $\sigma$ is the desired standard deviation of the Gaussian PDF.

Each received at the packet receiver 106 from the PDV generator 104 is time-stamped with the time ($T_r$) at which the packet is received. The packet receiver 106 calculates and plots the total packet delay ($T_r-T_s$) of each packet. The delay variation (PDV) of a fixed sample can be calculated and plotted as a histogram. The packet delay analysis package of the packet receiver 106 then calculates and plots derivative PDV for all of the packets.

Figure 2:
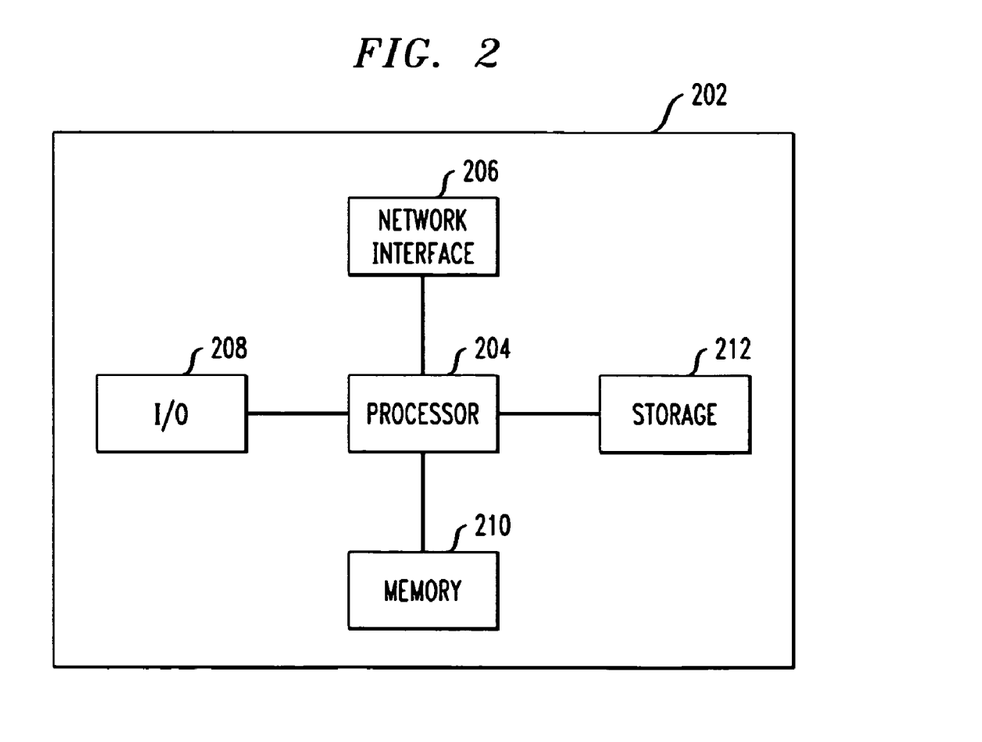
FIG. 2 illustrates a high level block diagram of a computer capable of implementing embodiments of the present invention.

The PDV simulator of FIG. 1 and the steps of the method of FIG. 4 (described below) may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Thus, the operation of computer 202 is defined by computer program instructions stored in memory 210 and/or storage 212 and the computer 202 will be controlled by processor 204 executing the computer program instructions. Accordingly, computer program instructions for implementing a PDV simulator application, such as the PDV simulator of FIG. 1, can be stored in memory 210 and/or storage 212 and executed by processor 204 executing the computer program instructions. Also, computer program instructions for performing the steps of the method of FIG. 4 can be stored in memory 210 and/or storage 212 and executed by processor 204 executing the computer program instructions. Computer 202 also includes one or more network interfaces 206 for communicating with other devices via a network. Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. One skilled in the art will also recognize that the functionality described herein may be implemented using hardware, software, and various combinations of hardware and software.

Figure 3:
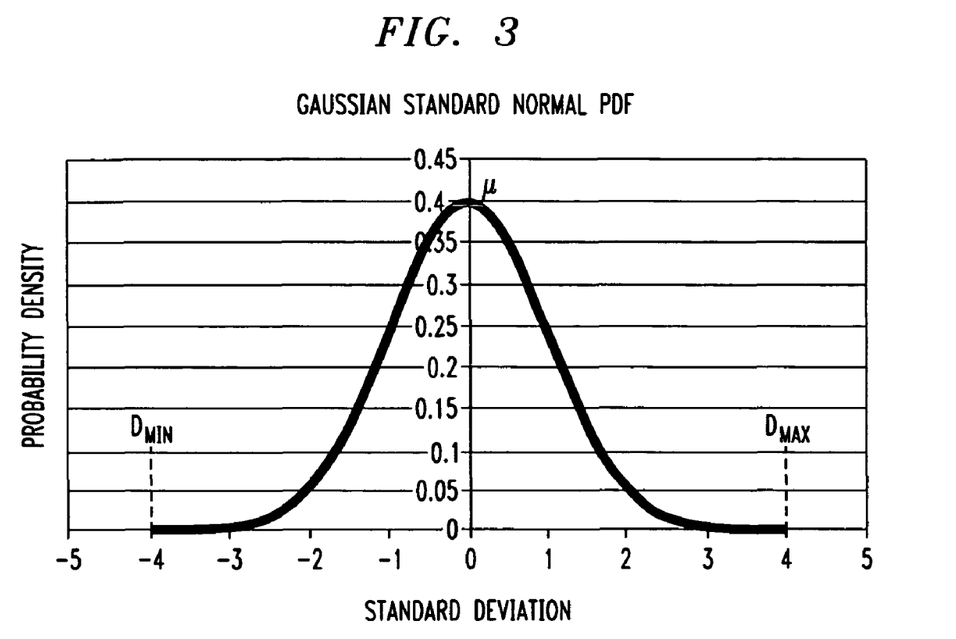
FIG. 3 illustrates a PDV having a Gaussian probability density function (PDF)

FIG. 3 illustrates a PDV having a Gaussian PDF. As illustrated in FIG. 3, $D_{MIN}$ is the minimum delay, $D_{MAX}$ is the maximum delay, and $\mu$ is the mean of the Gaussian PDF.

Figure 4:
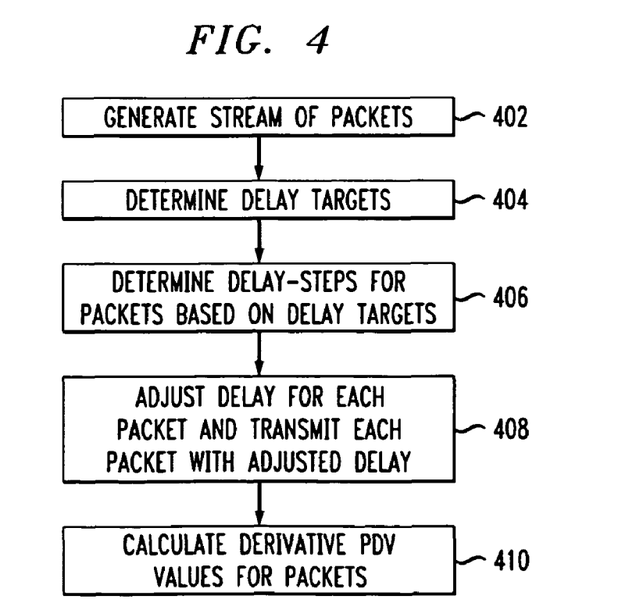
FIG. 4 illustrates a method for simulating and analyzing PDV according to an embodiment of the present invention.

FIG. 4 illustrates a method for simulating and analyzing PDV according to an embodiment of the present invention. The method of FIG. 4 can be performed by the PDV simulator of FIG. 1. At step 402, the packet generator 102 generates a stream of packets and transmits the stream of packets to the PDV generator 104. As described above, each packet in the stream of packets is generated at a regular interval.

At step 404, random delay target values are determined based on the Gaussian PDF. For example, the PDV generator 404 can select random delay target values that fit the Gaussian PDF curve shown in FIG. 3.

At step 406, delay-steps are determined for a series of packets based on each delay target value. The delay-steps are adjustments to a current delay value in order to change the current delay value in a direction towards the delay target value. The current delay is adjusted by the delay-step determined for each packet until the delay of one of the packets is equal to the delay target value. Then a new delay target value is determined (step 404) based on the Gaussian PDF, and these steps are repeated until a delay-step is calculated for each packet. According to various implementations, the delay-steps can be calculated using a variable step size or a fixed step size.

According to the variable delay-step size implementation, the delay-step is calculated as a random uniformly distributed value between minimum and maximum step sizes, $D_{step_{MIN}}$ and $D_{step_{MAX}}$, respectively, where $D_{step_{MIN}}$ is negative and $D_{step_{MAX}}$ is positive. If the difference between the current delay and the delay target value is negative (i.e., the delay target value is larger than the current delay), then the step size value is between 0 and $D_{step_{MAX}}$. Otherwise (i.e., if the delay target value is less than the current delay), the step size value is between $D_{step_{MIN}}$ and 0. The step size may be restricted from being larger (in either positive or negative directions) than a step size that will adjust the current delay to match the target delay.

According to the fixed delay-step size implementation, the delay-step is determined to be equal to either $D_{step_{MIN}}$ or $D_{step_{MAX}}$. If the difference between the current delay and the delay target value is negative (i.e., the delay target value is larger than the current delay), then the step size value is $D_{step_{MAX}}$. Otherwise (i.e., if the delay target value is less than the current delay), the step size value is $D_{step_{MIN}}$. In this implementation, when the fixed step size would overshoot the delay target value, then the step size required to adjust the current delay to match the delay target value is used instead of $D_{step_{MIN}}$ or $D_{step_{MAX}}$.

Figure 5:
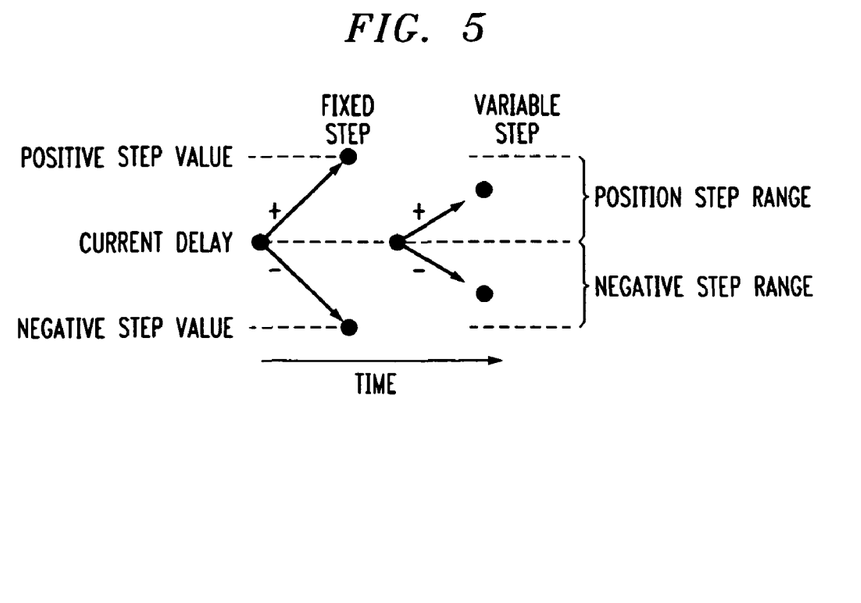
FIG. 5 illustrates delay-steps calculated using fixed and variable delay-step sizes.

FIG. 5 illustrates delay-steps calculated using fixed and variable delay-step sizes. As illustrated in FIG. 5, for fixed delay-steps, a step-size of either a fixed positive step value ($D_{step_{MIN}}$) or a fixed negative step value ($D_{step_{MIN}}$) is used to adjust the current delay, whereas for variable delay-steps, a step within a positive step range (between 0 and $D_{step_{MAX}}$) or within a negative step range (between $D_{step_{MIN}}$ and 0) is used to adjust the current delay.

Returning to FIG. 4, at step 408, the current delay for each packet is adjusted by the delay-step determined for that packet to determine a delay for each packet, and each packet is transmitted with the delay determined for that packet from the PDV generator 104 to the packet receiver 106.

Figure 6:
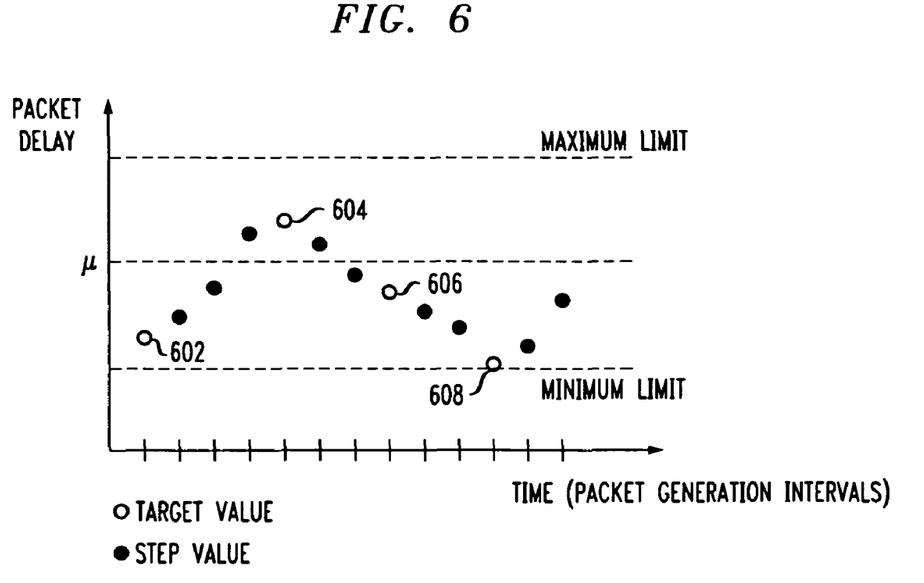
FIG. 6 illustrates repeatedly determining delay target values and applying delay-steps to reach the delay target values.

FIG. 6 illustrates repeatedly determining random delay target values and applying delay-steps to reach the delay target values. As illustrated in FIG. 6, μ is the mean of the Gaussian PDF shown in FIG. 3. The maximum and minimum limits for the packet delay correspond to the $D_{MIN}$ and $D_{MAX}$ of FIG. 3. Delay target values 602, 604, 606, and 608 are determined and various delay-steps are used to reach the delay target values 602, 604, 606, and 608.

The packet receiver 106 can analyze the packet delay value using a 400 point histogram graph. The resolution of the histogram is related to the PDV range by the following equation:

$$PDV\_Resolution = \frac{D_{MAX} - D_{MIN}}{400}$$

Returning to FIG. 4, at step 410, the packet receiver calculates the derivative of the PDV. The derivative PDV can be calculated using the following equation:

$$D\_PDV(t) = \frac{D_n(t) - D_n(t-1)}{\tau},$$

where τ is the packet generation period. The derivative PDV values can then be analyzed by the packet receiver 106 using a 400 point histogram graph. The resolution of the histogram is related to the derivative PDV range by the following equation:

$$D\_PDV\_Resolution = \frac{D\_PDV_{MAX} - D\_PDV_{MIN}}{400}.$$

Although the values of the derivative PDV are presented as a histogram, they can also be presented and analyzed in various other formats as well.

FIGS. 7-12 illustrate various PDV simulation results of a PDV simulation using the method of FIG. 4 with variable and fixed delay-step sizes. These results are for a PDV simulation using the following parameters:

$D_{MAX}$=30 ms $D_{MIN}$=0 ms $D_{step_{MAX}}$=100 μs

Target delay μ=20 ms

Target delay σ=2.5 ms

Packet Generation Rate=1000/sec.

Figure 7:
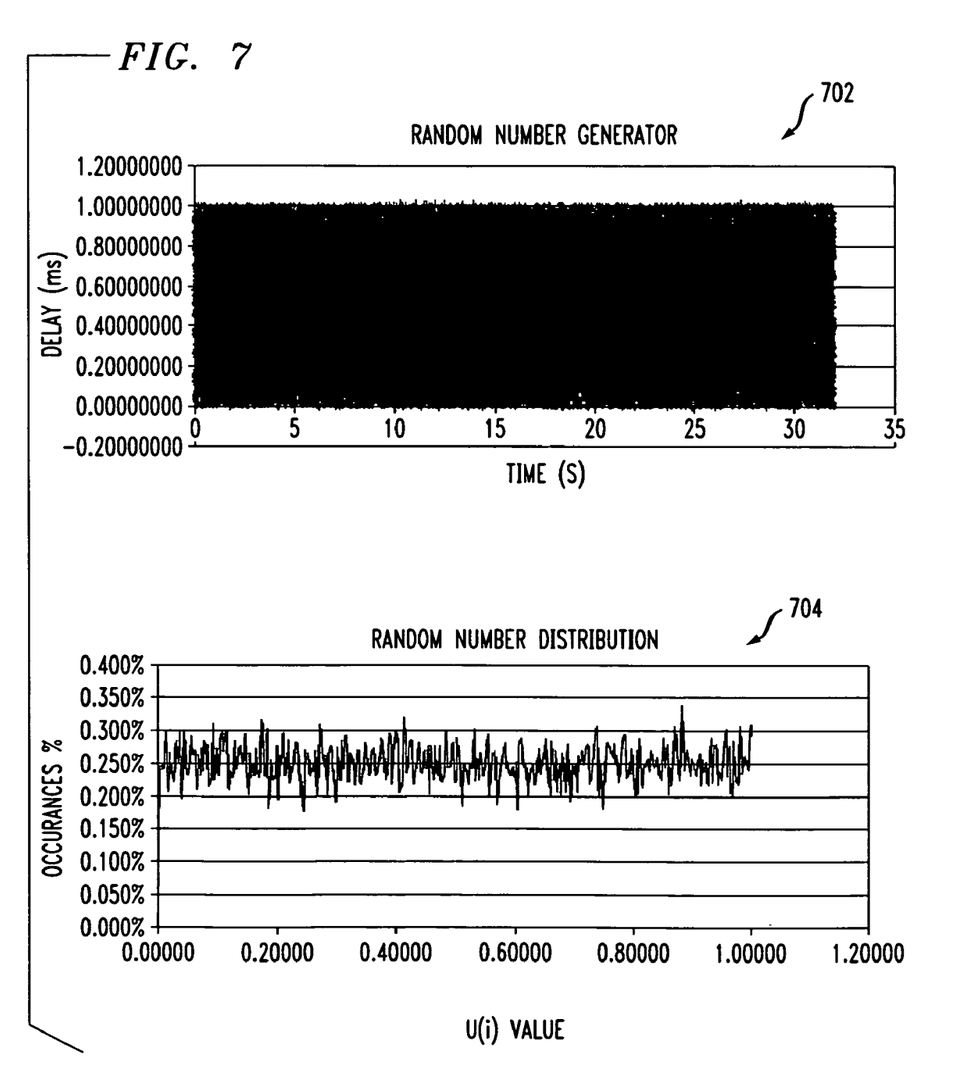
FIG. 7 illustrates random number generation used in the PDV simulation.

FIG. 7 illustrates random number generation used in the PDV simulation. Graph 702 shows a plot of the random number generator $U_i(t)$ over time, and graph 704 shows a histogram of the PDF of the random number generator $U_i(t)$. As shown in 702 and 704, PDF distribution of the random number generator $U_i(t)$ is relatively uniform between 0 and 1.

Figure 8:
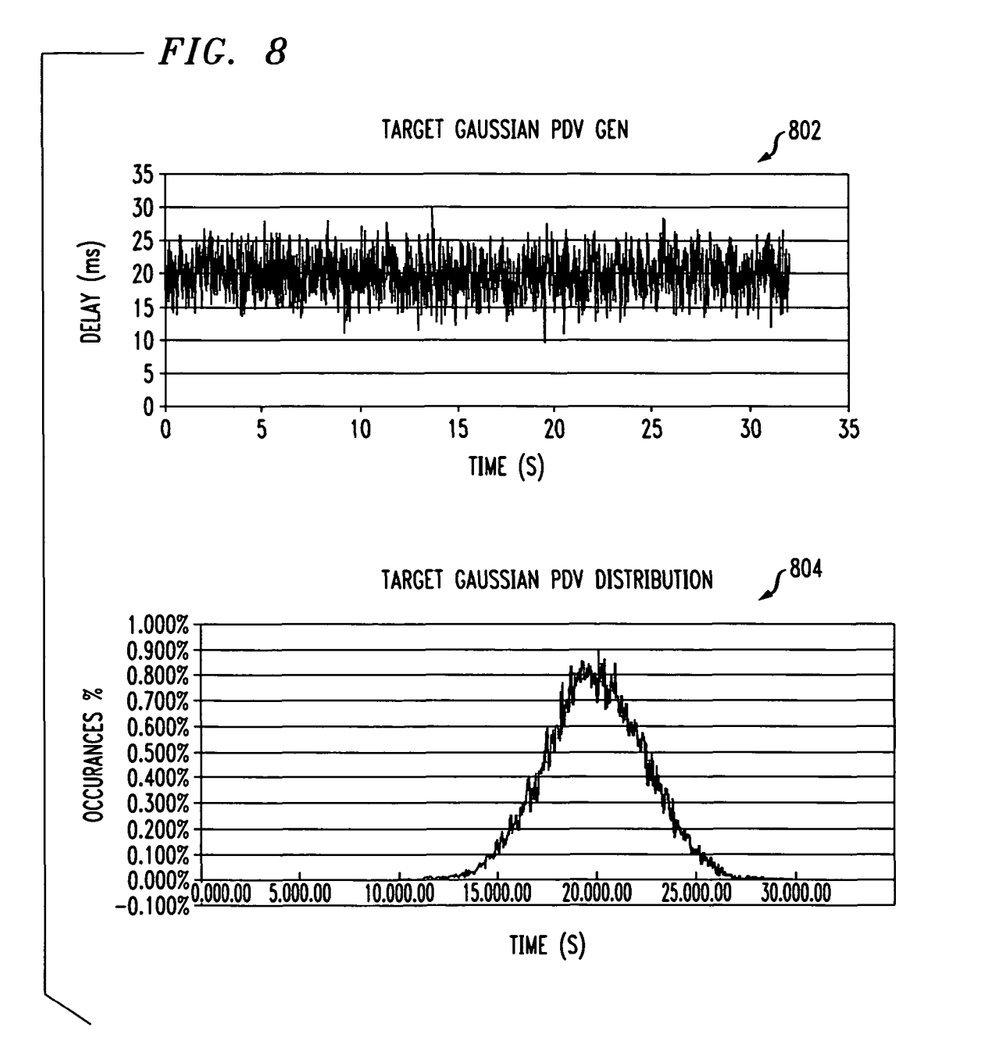
FIG. 8 illustrates Gaussian PDV delay target generation.

FIG. 8 illustrates Gaussian PDV delay target generation. Graph 802 shows the Gaussian PDV delay targets displayed over time, and graph 804 shows a PDF histogram for the Gaussian delay target distribution. The delay target values in graphs 802 and 804 include both the $D_G(t)$ and $D_O$ delay components. As illustrated in graphs 802 and 804, because of the short time duration of the simulation, there are very few values that actually achieve the min and max delay value. As shown in graph 804, the PDF histogram shows the classic Gaussian distribution of the delay target values. The actual analysis of this histogram places μ at 20.15 ms and σ at 2.519 ms.

Figure 9:
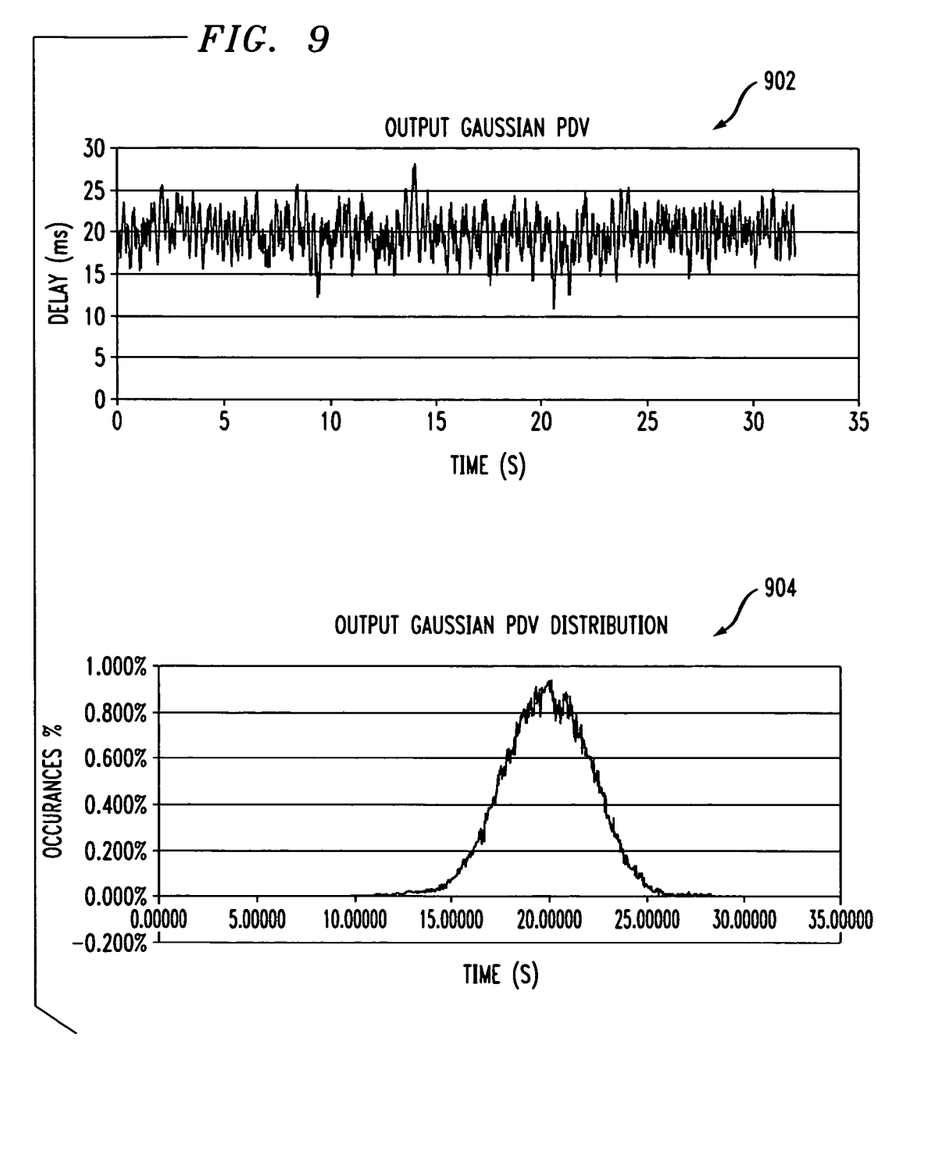
FIG. 9 illustrates PDV generation using variable delay-steps.

FIG. 9 illustrates PDV generation using variable delay-steps. The graphs of FIG. 9 show the actual PDV as seen by the packet receiver 106. Graph 902 shows the PDV displayed over time, and graph 904 shows the PDF histogram of these delays. The delay-step changes that the packets have experienced are uniformly variable between a ±100 μs range. Since these output delay values include the step changes as well as the target PDV values, there will be fewer delay values that achieve either the min or max PDV values. Accordingly, the accuracy of the statistical distribution increases with the number delay samples processed. The actual analysis of this histogram places the μ at 20.09 ms and σ at 2.206 ms.

Figure 10:
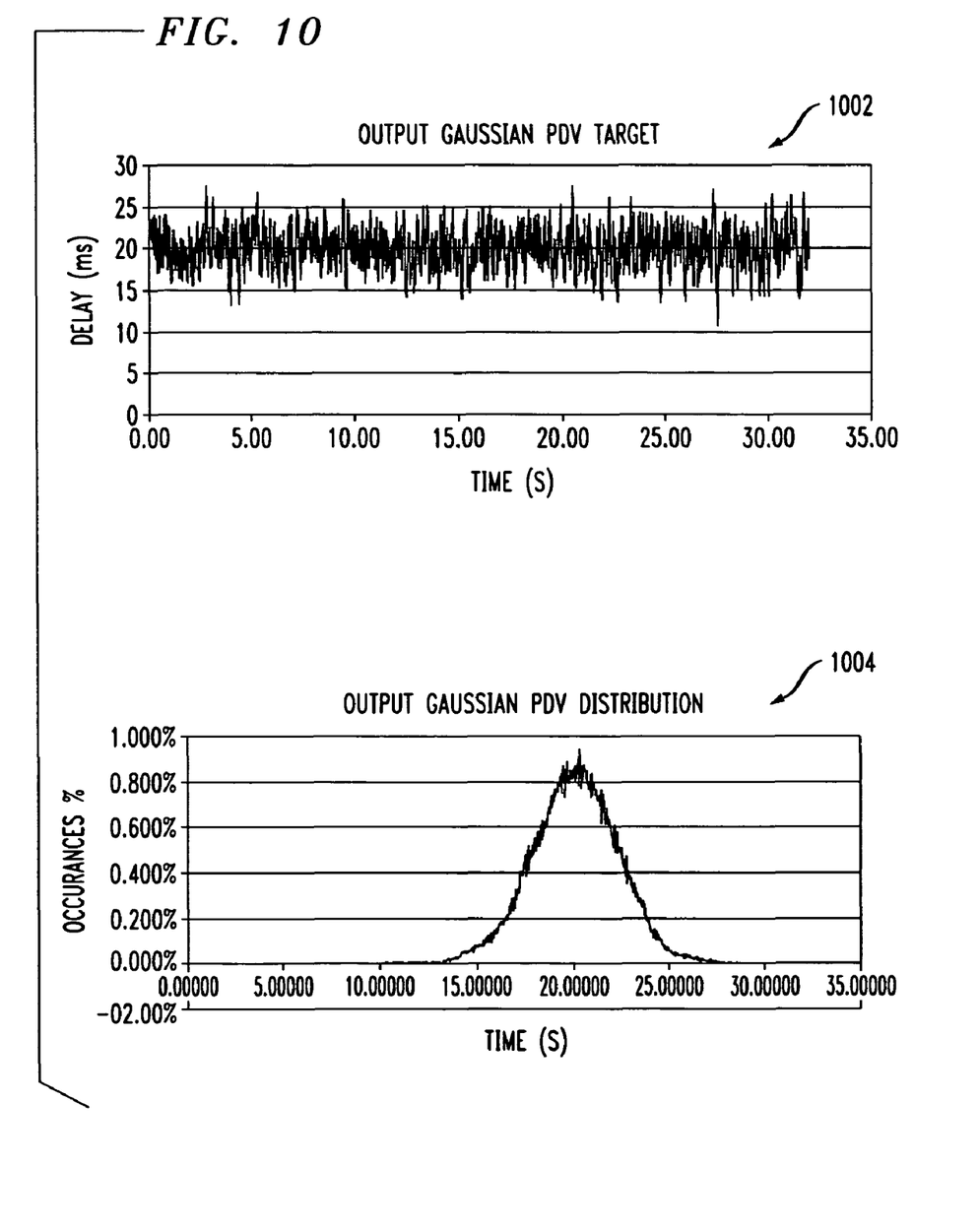
FIG. 10 illustrates PDV generation using fixed delay-steps.

FIG. 10 illustrates PDV generation using fixed delay-steps. The graphs of FIG. 10 show the actual PDV as seen by the packet receiver 106. Graph 1002 shows the PDV displayed over time, and graph 1004 shows the PDF histogram of these delays. The delay-step changes that these packets have experienced are typically fixed between a ±100 μs range. As in the variable step case, the output delay values include both the step changes as well as the target PDV values. However, since the average step value size is larger than in the variable step case, there are fewer steps between target values. If one compares the $D_{Total}(t)$ vs. time plots shown in graphs 702 and 802, it can be seen that there are fewer steps between target values in graph 802. However, it is difficult to see a difference between the histogram plots shown in graphs 704 and 804. The actual analysis of this histogram places μ at 20.15 ms and σ at 2.26 ms.

Figure 11:
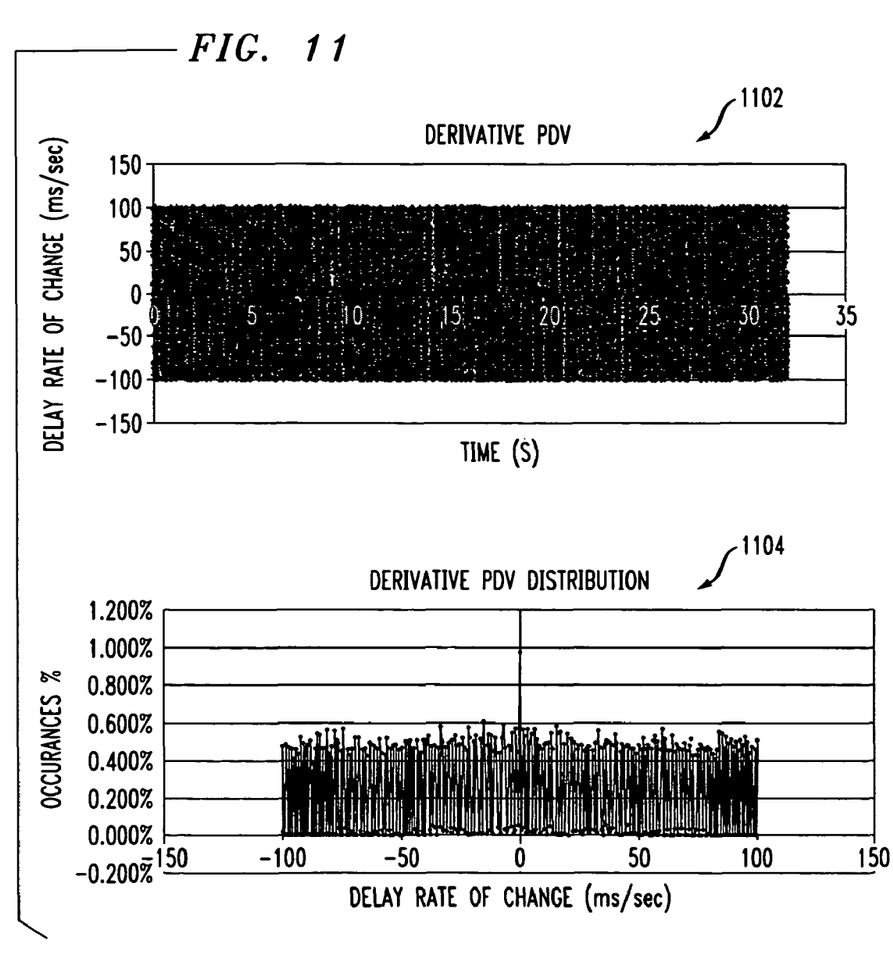
FIG. 11 illustrates derivative PDV using variable delay-steps.

FIG. 11 illustrates derivative PDV using variable delay-steps. The graphs of FIG. 11 show the derivative PDV as calculated at the packet receiver 106. The derivative PDV shows the delay rate of change on a packet-by-packet basis. Graph 1102 shows the derivative PDV displayed over time, and graph 1104 shows the PDF histogram for the derivative PDV for the variable delay-step case. As illustrated in graphs 1102 and 1104, it can be seen that the delay rate of change (derivative PDV) is bounded between ±100 ms/sec. If the periodic packet rate is known (1000 packet per second in this case), then the derivative PDV bound may be divided by the packet rate to yield the minimum and maximum packet delay-step size (100 μs in this case). Based on the histogram analysis shown in graph 1104, it can be seen that this variation is uniformly distributed across this range.

Figure 12:
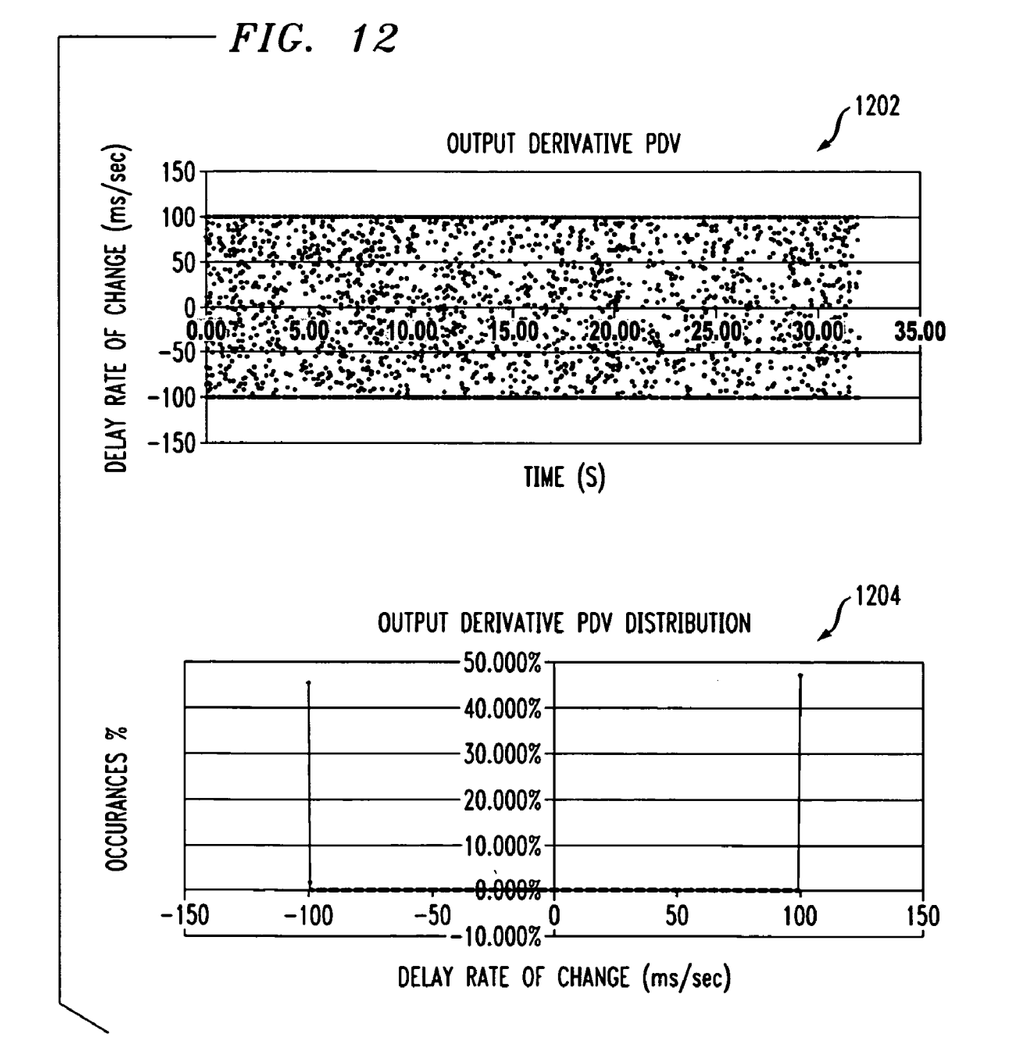
FIG. 12 illustrates derivative PDV using fixed delay-steps.

FIG. 12 illustrates derivative PDV using fixed delay-steps. Graph 1202 shows the derivative PDV displayed over time, and graph 1204 shows the PDF histogram for the derivative PDV for the fixed delay-step case. It can be seen that graphs 1202 and 1204 of FIG. 12 are very different from graphs 1102 and 1104 of FIG. 11. Graph 1202 of FIG. 12 shows that, in the fixed delay-step case, the majority of the step delay values are at either end of the min/max step range. This is also verified by the PDF histogram shown in graph 1204, which shows 90% of the delay-step change values are equally divided between the min and max step values. None of this information is evident from viewing simple PDF histograms (graphs 904 and 1004) of the PDV shown in FIGS. 9 and 10. Accordingly, the derivative PDV analysis of FIGS. 11 and 12 provides additional information that is useful in understanding how PDV changes over time. Such information may be used to not only analyze the PDV of a packet stream, but also for specifying the PDV level that a timing emulation service (TES) or packet network timing (PNT) IWF should be able to tolerate while providing compliant timing recovery.

As described above, the derivative PDV metric is useful for analyzing the delay rate of change of a packet stream. This information is useful for not only describing the nature of PDV, but also for specifying PDV characteristics useful for packet adaptive timing recovery stress testing. In addition to the actual PDV characteristics, another conclusion of this contribution is that sufficient time must be allotted for any PDV stress test involving statistical distributions. If Gaussian probability density functions are used to modulate PDV, consideration must be made to the likelihood that minimum and maximum PDV values will actually be realized during the course of a test. This consideration should be based on actual packet rate and PDF. Therefore, a minimum time limit needs to be specified for PDV stress testing.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   generating, by a packet generator, a stream of packets, each packet generated at a regular interval;
   determining, by a packet delay variation (PDV) generator, a delay for each packet based on a series of randomly determined delay target values;
   generating, by the PDV generator, a packet delay variation (PDV) by delaying each packet with the delay determined for that packet; and
   calculating, by a packet receiver, a derivative PDV based on the generated PDV, wherein the derivative PDV value for each packet is determined based on a quotient of a difference between the delay of a current packet and the delay of a previous packet, and the interval for generating packets.

2. The method of claim 1, wherein said step of calculating derivative PDV comprises:
   calculating a rate of change of the delay on a packet-by-packet basis.

3. The method of claim 1, wherein said step of calculating derivative PDV comprises:
   calculating a derivative PDV value for each packet using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and τ is the regular interval for generating the packets.

4. The method of claim 1, further comprising:
   generating, by the packet receiver, a histogram of the derivative PDV.

5. The method of claim 1, further comprising:
   determining, by the packet receiver, delay stresses for adaptive packet timing recovery stress testing of a network based on the derivative PDV.

6. The method of claim 1, wherein said step of determining a delay for each packet comprises: (a) selecting a random delay target value based on a probability density function (PDF); (b) adjusting the delay of sequential packets in said stream of packets by delay-steps determined based on the random delay target value, until the delay of a packet is equal to the random delay target value; and (c) repeating steps (a) and (b) to determine a delay value for each packet in said stream of packets.

7. The method of claim 6, wherein step (b) comprises for each of said sequential packets:
   determining a difference between a current delay for the packet and the random delay target value;
   if the difference between the current delay for the packet and the random delay target value is negative, adjusting the current delay for the packet by a delay-step determined as a uniformly distributed value between 0 and a maximum step size; and
   if the difference between the current delay for the packet and the random delay target value is positive, adjusting the current delay for the packet by a delay-step determined as a uniformly distributed value between a minimum step size and 0.

8. The method of claim 6, wherein step (b) comprises for each of said sequential packets:
   determining a difference between a current delay for the packet and the random delay target value;

if the difference between the current delay for the packet and the random delay target value is negative, adjusting the current delay for the packet by a fixed positive delay-step; and if the difference between the current delay for the packet and the random delay target value is positive, adjusting the current delay for the packet by a fixed negative delay-step.

9. The method of claim 6, wherein said PDF is a Gaussian PDF.

10. A system comprising:
means for generating a stream of packets such that each packet is generated at a regular interval;
means for determining a delay for each packet based on a series of randomly determined delay target values;
means for generating packet delay variation (PDV) by delaying each packet with the delay determined for that packet; and
means for calculating derivative PDV based on the generated PDV, wherein the derivative PDV value for each packet is determined based on a quotient of a difference between the delay of a current packet and the delay of a previous packet, and the interval for generating packets.

11. The system of claim 10, wherein said means for calculating derivative PDV comprises:
means for calculating a rate of change of the delay on a packet-by-packet basis.

12. The system of claim 10, wherein said means for calculating derivative PDV comprises:
means for calculating a derivative PDV value for each packet using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and $\tau$ is the regular interval for generating the packets.

13. The system of claim 10, further comprising:
means for generating a histogram of the derivative PDV.

14. The system of claim 10, wherein said means for determining a delay for each packet comprises:
means for selecting a random delay target value based on a probability density function (PDF); and
means for adjusting the delay of sequential packets in said stream of packets by delay-steps determined based on the random delay target value, until the delay of a packet is equal to the random delay target value.

15. The system of claim 14, wherein said means for adjusting comprises:
means for determining a difference between a current delay for the packet and the random delay target value; and
means for adjusting the current delay of the packet by a delay-step determined as a uniformly distributed value between a minimum step size and a maximum step size based on the difference between the current delay for the packet and the random delay target value.

16. The system of claim 14, wherein said means for adjusting comprises:
means for determining a difference between a current delay for the packet and the random delay target value; and
means for adjusting the current delay of the packet by one of a fixed positive delay-step and a fixed negative delay-step based on the difference between the current delay for the packet and the random delay target value.

17. The system of claim 14, wherein said PDF is a Gaussian PDF.

18. A computer readable medium storing computer executable instructions, said computer executable instructions defining steps comprising:
generating a stream of packets, each packet generated at a regular interval;
determining a delay for each packet based on a series of randomly determined delay target values;
generating packet delay variation (PDV) by delaying each packet with the delay determined for that packet; and
calculating derivative PDV based on the generated PDV, wherein the derivative PDV value for each packet is determined based on a quotient of a difference between the delay of a current packet and the delay of a previous packet, and the interval for generating packets.

19. The computer readable medium of claim 18, wherein the computer executable instructions defining the step of calculating derivative PDV comprise computer readable instructions defining the step of:
calculating a rate of change of the delay on a packet-by-packet basis.

20. The computer readable medium of claim 18, wherein the computer executable instructions defining the step of calculating derivative PDV comprise computer readable instructions defining the step of:
calculating a derivative PDV value for each packet using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and $\tau$ is the regular interval for generating the packets.

21. The computer readable medium of claim 18, further comprising computer executable instructions defining the step of:
generating a histogram of the derivative PDV.

22. The computer readable medium of claim 18, further comprising computer executable instructions defining the step of:
specifying delay stresses for adaptive packet timing recovery stress testing based on the derivative PDV.

23. The computer readable medium of claim 18, wherein the computer executable instructions defining the step of determining a delay for each packet comprise computer executable instructions defining the steps of: (a) selecting a random delay target value based on a probability density function (PDF); (b) adjusting the delay of sequential packets in said stream of packets by delay-steps determined based on the random delay target value, until the delay of a packet is equal to the random delay target value; and (c) repeating steps (a) and (b) to determine a delay value for each packet in said stream of packets.

24. The computer readable medium of claim 23, wherein the computer executable instructions defining step (b) comprise computer readable instructions defining the following steps for each of said sequential packets:
determining a difference between a current delay for the packet and the random delay target value;
if the difference between the current delay for the packet and the random delay target value is negative, adjusting the current delay for the packet by a delay-step determined as a uniformly distributed value between 0 and a maximum step size; and if the difference between the current delay for the packet and the random delay target value is positive, adjusting the current delay for the packet by a delay-step determined as a uniformly distributed value between a minimum step size and 0.

25. The computer readable medium of claim 23, wherein the computer executable instructions defining step (b) comprise computer readable instructions defining the following steps for each of said sequential packets:

determining a difference between a current delay for the packet and the random delay target value;

if the difference between the current delay for the packet and the random delay target value is negative, adjusting the current delay for the packet by a fixed positive delay-step; and if the difference between the current delay for the packet and the random delay target value is positive, adjusting the current delay for the packet by a fixed negative delay-step.

26. A method comprising:

generating, by a packet generator, a stream of packets, each packet generated at a regular interval;

determining, by a packet delay variation (PDV) generator, a delay for each packet based on a series of randomly determined delay target values;

generating, by the PDV generator, a packet delay variation (PDV) by delaying each packet with the delay determined for that packet; and calculating, by a packet receiver, a derivative PDV based on the generated PDV, wherein the derivative PDV value for each packet is determined using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and $\tau$ is the regular interval for generating the packets.

27. A system comprising:

means for generating a stream of packets such that each packet is generated at a regular interval;

means for determining a delay for each packet based on a series of randomly determined delay target values;

means for generating packet delay variation (PDV) by delaying each packet with the delay determined for that packet; and means for calculating derivative PDV based on the generated PDV, wherein the derivative PDV value for each packet is determined using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and $\tau$ is the regular interval for generating the packets.

28. A computer readable medium storing computer executable instructions, said computer executable instructions defining steps comprising:

generating, by a packet generator, a stream of packets, each packet generated at a regular interval;

determining, by a packet delay variation (PDV) generator, a delay for each packet based on a series of randomly determined delay target values;

generating, by the PDV generator, a packet delay variation (PDV) by delaying each packet with the delay determined for that packet; and calculating, by a packet receiver, a derivative PDV based on the generated PDV, wherein the derivative PDV value for each packet is determined using the equation:

$$D\_PDV(t) = \frac{D_n(t) - D_n(t-1)}{\tau},$$

wherein $D_n(t)$ is the delay of a current packet, $D_n(t-1)$ is the delay of a previous packet, and t is the regular interval for generating the packets.

* * * * *